United States Patent [19]
Fredricson

[11] 3,843,147
[45] Oct. 22, 1974

[54] PALLET TRUCK

[75] Inventor: Yngve Albin Fritiof Fredricson, Kalmar, Sweden

[73] Assignee: AB Hill & Co., Kalmar, Sweden

[22] Filed: Nov. 10, 1972

[21] Appl. No.: 305,486

[30] Foreign Application Priority Data
Dec. 2, 1971  Sweden.............................. 15420/71

[52] U.S. Cl. ............................. 280/43.12, 254/8 C
[51] Int. Cl................................................. B66f 5/04
[58] Field of Search.......... 280/43.12; 254/2 C, 8 C; 60/486

[56] References Cited
UNITED STATES PATENTS
2,462,007    2/1949    Schreck ...................... 280/43.12 X
3,072,418    1/1963    Becker.............................. 280/43.12
3,701,211    10/1972   Best................................. 280/43.12

FOREIGN PATENTS OR APPLICATIONS
860,752    12/1952    Germany .............................. 60/479

Primary Examiner—David Schonberg
Assistant Examiner—Michael Forman
Attorney, Agent, or Firm—Berman, Bishoff & Platt

[57] ABSTRACT

A pallet truck with a truck-raising piston that may be actuated hydraulically by a two-piston unit in response to one of three selected positions of a handle in a draw-bar simultaneously used for pumping hydraulic fluid into the two-piston unit so as to raise the truck with full power or with reduced power or to set the truck in its quiescent position.

9 Claims, 9 Drawing Figures

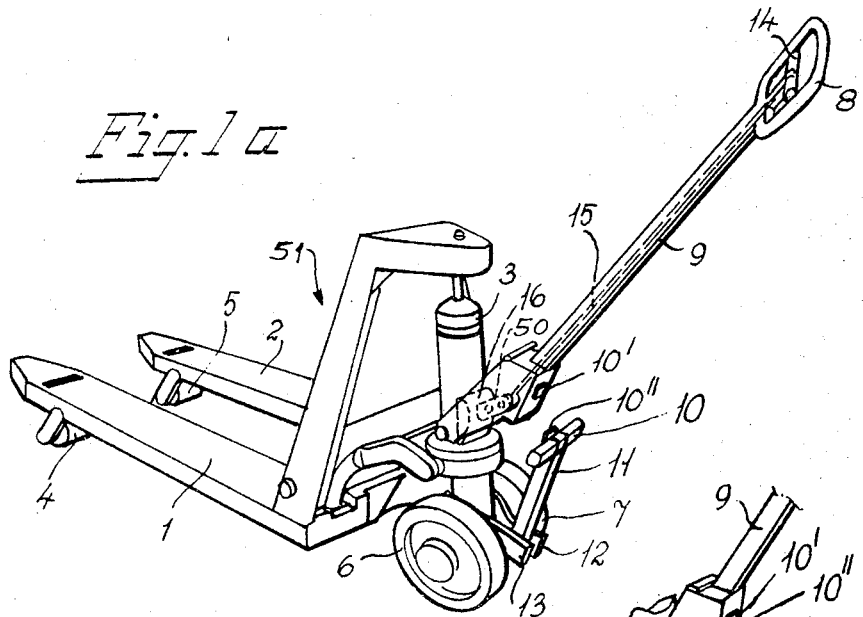
Fig. 1a
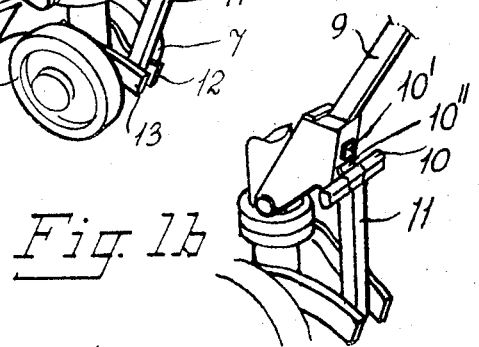
Fig. 1b
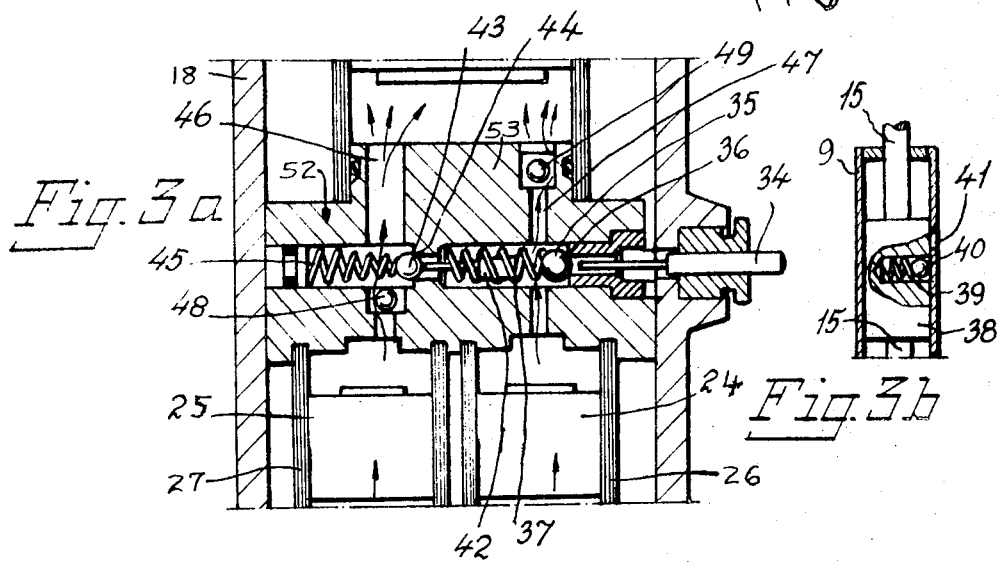
Fig. 3a
Fig. 3b

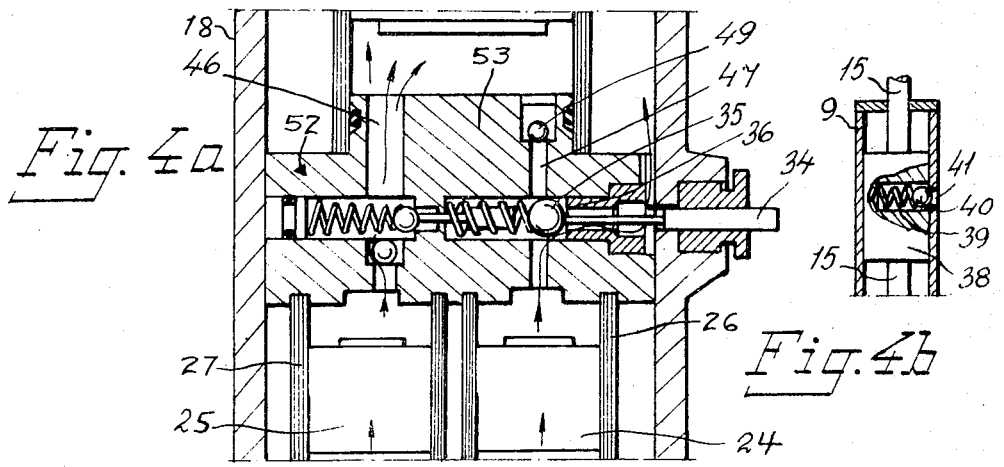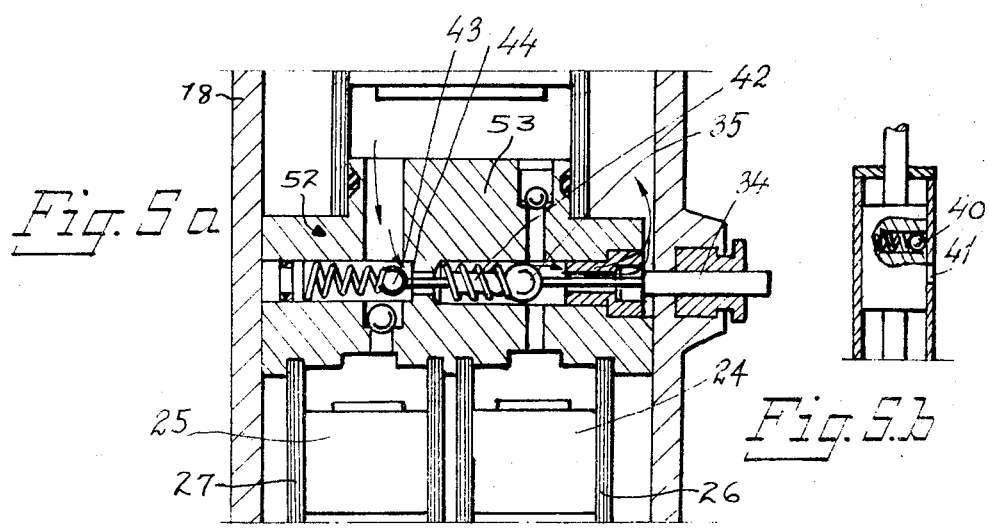

PALLET TRUCK

BACKGROUND OF THE INVENTION

There are a plurality of pallet trucks in the market, which unfortunately have disadvantages of different kinds. One of these disadvantages is that the limit of the lifting capacity of the truck generally is determined by the maximum capability of the person handling the truck.

SUMMARY OF THE INVENTION

This invention refers to a pallet truck with a jack for raising the truck, said jack being actuable by either one or two hydraulic pistons in a two-piston unit.

The object of this invention is to provide a pallet truck that is adapted to the capability of the person handling it. This person can lift a great deal more with the aid of the truck of the invention. Furthermore, the invention makes it feasible to achieve a greater lifting rate. In addition to this, the structure in accordance with the invention provides the possibility of choosing between hand and foot pumping, which latter have not been found in combination previously.

The means by which the properties mentioned above are attained are defined by the accompanying claims.

BRIEF DESCRIPTION OF THE DRAWINGS

The invention will be described more specifically below with reference to the accompanying drawings, in which FIG. 1a shows a perspective view of a pallet truck in accordance with the invention, FIG. 1b shows a perspective view of a draw-bar and a pedal in a pallet truck in accordance with FIG. 1a set in position for interaction, FIG. 2 is a cross section of the jack included in the pallet truck, FIGS. 3a, 4a and 5a, respectively, illustrate a change-over device in accordance with the invention set in different positions, and FIGS. 3b, 4b and 5b, respectively, show the positions of a change-over detent corresponding to the positions of adjustment illustrated in the respective FIGS. 3a, 4a and 5a.

The same reference numerals have been utilized in the various figures to indicate the same parts.

DESCRIPTION OF THE PREFERRED EMBODIMENT

Figure 2:
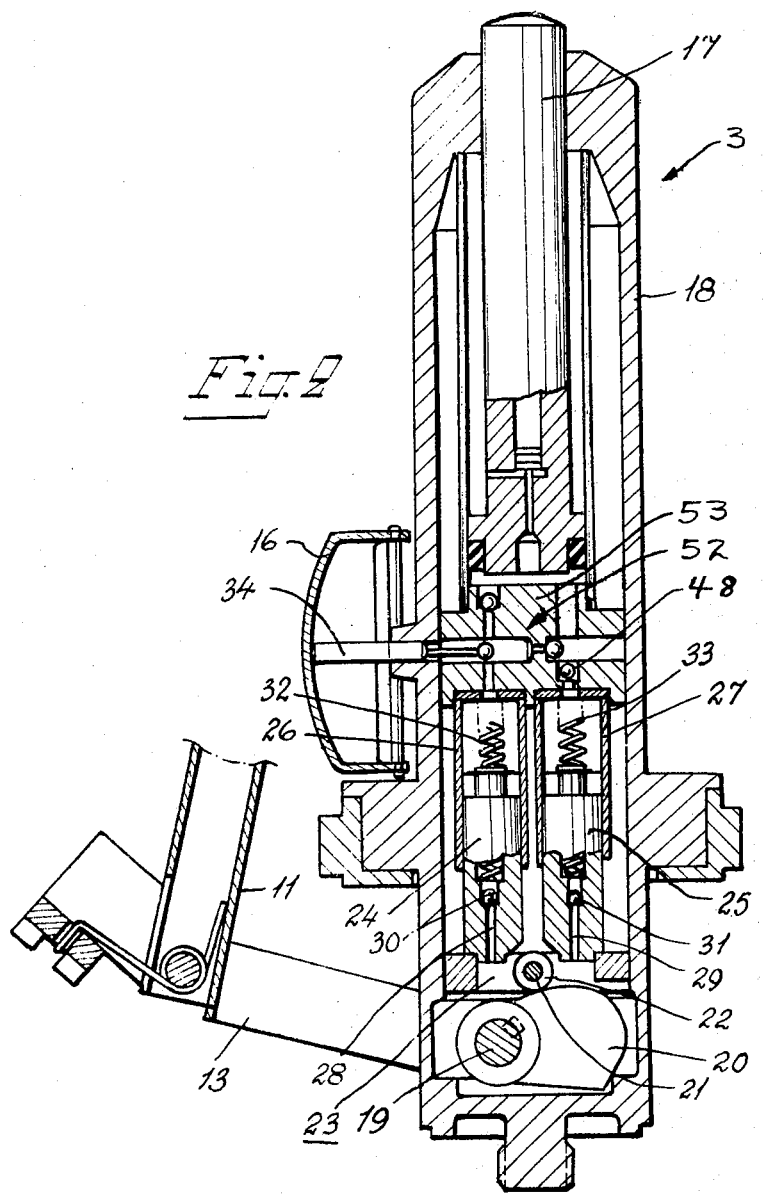

FIG. 1a is a perspective view of a pallet truck 51 in accordance with the invention provided with a two stage hydraulic system. The fundamental lifting portion is designed in conventional manner with two forks 1 and 2, respectively, which may be raised parallel to the ground by means of a hydraulic jack designed in accordance with the invention and indicated by the general designation 3. At the end of the truck remote to the jack 3, the forks 1 and 2 are provided with fork rollers 4 and 5, respectively, and the truck is provided with wheels 6 and 7 at its jack end. Furthermore, the truck has a draw-ring 8 and a draw-bar 9 with a dog boss 10' as well as a pedal 10 with a pedal arm 11, a dog boss 10" and a pedal arm pair 12, 13.

A handle 14 is positioned in the draw-ring 8 and can exert a compressive force on a control plate 16 and thereby on a pin in the jack 3 over a transfer rod 15 extending in the draw-bar and a gear mechanism (not illustrated) of conventional type in manner that will be described below.

FIG. 2 shows the hydraulic unit located in the jack 3 more specifically. A piston 17 in a housing 18 is axially displaceable, wherein its upper end in being raised may raise the pallet truck as known from U.S. Pat. No. 2,462,007. This axial displacement of the piston 17 is achieved by it being actuated by a hydraulic fluid enclosed in the housing 18 as the result of pumping with the draw-ring 8 and the draw-bar 9 so as to actuate the pedal 10 manually over the cooperating bosses 10' and 10" or else by pumping directly on the pedal 10 with a foot simultaneously with adjusting the handle 14 in a specific manner which will be described below.

When the pedal 10 is urged downwards, the resulting movement of the pedal arm 11 and the pedal arm pair 12, 13 (only pedal arm 13 is illustrated in FIG. 2) will cause a cam 20 secured to a shaft 19 to rotate so as to actuate a roller 22 mounted on a shaft 21 in such manner that a two-piston unit 23 that is secured to said shaft will be displaced axially with respect to the jack housing 18. The two-piston unit includes two pistons 24 and 25, which may slide in sheaths 26 and 27, respectively, in the axial direction of the jack, and the hydraulic fluid enclosed in the jack housing may be displaced in upwards direction in said sheaths through channels 28 and 29 and past check valves having the form of balls 30 and 31. The pistons 24 and 25 are displaced against the bias of helical springs 32 and 33 introduced into each sheath 26, 27, with the hollow interiors of said springs also forming channels for the hydraulic fluid when this has been conveyed from the channels 28 and 29 through the interiors of the respective pistons 24 and 25.

The power of the jack designed in accordance with the invention is adjusted in the following manner. The position of adjustment of handle 14 is transferred to control plate 16 over a gear mechanism, said control plate in turn engaging a pin 34. Depending on the extent to which the handle 14 is pulled, the pin 34 will (a) remain unactuated, (b) be set to an intermediate position, (c) be set to an end position, with each of these positions resulting in different actuation of piston 17 and thus of the truck. With the pin unactuated pumping will be carried out at full power, when the pin is set to its intermediate position pumping will be carried out at reduced power, and when the pin is set to its end position the hydraulic pressure on the piston 17 will be reduced so that said piston is disposed in its quiescent position.

The pin 34 is mounted to extend partly within and partly outside of jack housing 18 and forms part of a change-over device generally indicated by the numeral 52 which is located within housing 18 between piston 17 and two-part unit 23 and whose structure and operation will hereinafter be described. The change-over device comprises block 53, channels 46, 47, ball valves 35, 43, springs 37, 45, check valves 48, 49, pins 34, 42 and associated parts.

The various positions of adjustment of the pin 34 are illustrated in FIGS. 3a, 4a and 5a, respectively, and the corresponding positions of a detent associated with the handle 14 are illustrated in FIGS. 3b, 4b and 5b, respectively. As may be seen in FIGS. 3a – 5a, particularly FIG. 3a, the pin 34 may engage a ball 35 at its inner end, said ball being urged against a valve seat 36 by means of a helical spring 37 in its quiescent position. FIG. 3*b* shows a detent block 38 which may slide for example in an arbitrary position in the draw-bar 9 so as to interconnect two sections of the transfer rod 15. Detent block 38 contains a bore in which a helical spring 39 is biased, said spring engaging the material of the block at one of its ends and engaging a ball 40 at its other end. In the case illustrated in FIG. 3*b*, the ball 40 engages the wall of the draw-bar 9 below an aperture 41 which has been drilled in said material and which has a smaller diameter than that of the ball 40.

Reverting to FIG. 3*a*, it may be seen that a second pin 42 is located behind the ball 35, counting at right angles to the direction of the axis of the jack, and inside the spring 37, said pin 42 being unactuated in the position illustrated in FIG. 3*a* but being engaged by the ball 35 when the pin 34 is urged inwards. FIG. 3*a* shows a check valve in the form of a ball 43 urged against a valve seat 44 by means of a conical spring 45. The position of pin 34 in FIG. 3*a* corresponds to the handle 14 (FIG. 1*a*) not being pulled, i.e., handle 14 is then in its quiescent position, with control plate 16 also being in its quiescent position and hence not engaging the external end of pin 34. However, as handle 14 is successively pulled, control plate 16 is subjected to an increasing compressive force by the above-mentioned gear mechanism which is located at the point of engagement 50 (FIG. 1*a*) between transfer rod 15 and control plate 16. Consequently, when the handle is pulled to its extreme position in the direction of the operator, then control plate 16 is urged to its extreme position as compared to its quiescent position, thereby displacing pin 34 to the greatest possible extent, i.e., corresponding to FIG. 5*a*. When pin 34 is unactuated, in other words when the handle 14 is not being pulled and thus control plate 16 is not being actuated, the check valve balls 35 and 43 are disposed in their positions illustrated in FIG. 3*a*, and hydraulic fluid that is urged upwards by the two pistons 24 and 25 (FIG. 2) will then be supplied through channels 46 and 47 to the lower portion of piston 17. Thus, the check valve balls 48 and 49 will be urged out of their quiescent positions by the flowing fluid, the flow of which is indicated by arrows in FIG. 3*a*.

When the control handle 14 is pulled to its intermediate position, with the ball 40 snapping into the aperture 41 as illustrated in FIG. 4*b*, the control plate 16 will urge the pin 34 to the position illustrated in FIG. 4*a* over the gear mechanism in draw-bar 9. Pin 34 will then urge ball 35 out of engagement with valve seat 36, and thus hydraulic fluid from piston 25 will no longer be supplied to channel 47 for actuating piston 17 and will instead follow the path illustrated by arrows while not performing any useful work. Channel 46 remains open in this case the same as before, and the hydraulic pressure from only one of the pistons in the two-piston unit, namely piston 24, will now actuate piston 17 so as to raise the latter and thus the truck. However, this movement is carried out slower and with less power than in the case of FIGS. 3*a* and 3*b*, respectively.

When the handle 14 is pulled to its end position, the pin 34 will be displaced to the position illustrated in FIG. 5*a* by control plate 16. Thus ball 40 will be displaced from aperture 41 to the position indicated in FIG. 5*b*. Pin 34 (FIG. 5*a*) engages ball 35 in the same manner as according to FIG. 4*a*, but this time ball 35 in turn engages pin 42, which in turn displaces ball 43 from its valve seat 44. In this manner the hydraulic fluid that has actuated piston 17 as described above will follow the path indicated by the arrows in FIG. 5*a* so that piston 17 will become entirely unactuated and will be reset to its quiescent position.

I claim:

1. A pallet truck comprising fork means for supporting a load, wheels mounted at both ends of said fork means for engaging a base, hydraulic jack means in a housing mounted on an axle supporting one of said wheels for raising and lowering said fork means with respect to said base, said jack means including a first piston for engaging said fork means and a two-piston unit having second and third hydraulic pistons for hydraulically actuating said first piston, a change-over device mounted on and within said housing having three positions for controlling operation of said two-piston unit, drawbar means for the truck and handle means in said drawbar means including means for engaging and setting said change-over device to any selected one of its three positions wherein (a) with said change-over device set in its first position hydraulic fluid is unobstructedly supplied by the second and third pistons to the first piston for raising the fork means with full power, (b) with the change-over device set in its second position the hydraulic fluid flow from one of the second and third pistons to the first piston becomes inactive, while the flow of hydraulic fluid from the other of the second and third pistons to the first piston causes the fork means to be raised with reduced power, and (c) with the change-over device set in its third position the hydraulic fluid from the second and third pistons to the first piston becomes inactive concurrently with hydraulic fluid that has previously actuated the first piston having a free outlet so as to unload the first piston for setting the latter in its quiescent position.

2. A pallet truck as defined in claim 1, wherein said change-over device is located between the two-piston unit and the first piston and comprises pin means actuated by said handle means.

3. A pallet truck as defined in claim 2, wherein a valve cooperates with one piston of the two-piston unit, said pin means opening said valve when the change-over device is set to its second position for causing the flow of hydraulic fluid from said one piston to the first piston to become inactive.

4. A pallet truck as defined in claim 3, wherein said valve comprises a ball engaging second pin means against the bias of spring means with the change-over device in its third position, said second pin means opening a second valve cooperating with the other piston of the two-piston unit for causing the flow of hydraulic fluid from said other piston to the first piston to become inactive.

5. A pallet truck as defined in claim 4, wherein also said second valve comprises a ball.

6. A pallet truck as defined in claim 1, wherein pedal means are provided for actuating said two-piston unit.

7. A pallet truck as defined in claim 1, wherein said draw-bar means cooperate with pedal means for actuating said two-piston unit.

8. A pallet truck as defined in claim 1, wherein said change-over device is connected to said handle means in said draw-bar means by a transfer rod forming part of said means for engaging and setting the change-over device.

9. A pallet truck as defined in claim 8, wherein said transfer rod is adjustable to three individual positions in said draw-bar means.

\* \* \* \* \*